(12) United States Patent
Iida

(10) Patent No.: US 10,876,652 B2
(45) Date of Patent: Dec. 29, 2020

(54) COOLING DEVICE FOR ADDITIVE INJECTION VALVE

(71) Applicant: DENSO CORPORATION, Kariya (JP)

(72) Inventor: Junya Iida, Kariya (JP)

(73) Assignee: DENSO CORPORATION, Kariya (JP)

( * ) Notice: Subject to any disclaimer, the term of this patent is extended or adjusted under 35 U.S.C. 154(b) by 196 days.

(21) Appl. No.: 16/227,187

(22) Filed: Dec. 20, 2018

(65) Prior Publication Data

US 2019/0195391 A1    Jun. 27, 2019

(30) Foreign Application Priority Data

Dec. 25, 2017  (JP) ................................ 2017-248241

(51) Int. Cl.
  *F16K 49/00* (2006.01)
  *F01N 3/08* (2006.01)
  *F01N 3/20* (2006.01)

(52) U.S. Cl.
  CPC ............... *F16K 49/00* (2013.01); *F01N 3/08* (2013.01); *F01N 3/2066* (2013.01); *F01N 2610/00* (2013.01); *F01N 2610/11* (2013.01); *F01N 2610/1453* (2013.01)

(58) Field of Classification Search
  CPC .......... F16K 49/00; F16K 17/24; F16K 17/04; F16K 17/06; F01N 3/08; F01N 3/2066; F01N 2610/00; F01N 2610/11; F01N 2610/1453
  See application file for complete search history.

(56) References Cited

U.S. PATENT DOCUMENTS

| | | | |
|---|---|---|---|
| 7,043,922 B2 | 5/2006 | Thompson et al. | |
| 8,881,995 B2 | 11/2014 | Prociw et al. | |
| 8,973,355 B2 | 3/2015 | Shovels | |
| 9,284,871 B2 | 3/2016 | Knittel et al. | |
| 9,518,592 B2 | 12/2016 | Wright et al. | |
| 2013/0228231 A1* | 9/2013 | Nagel .................. | F02M 53/043 137/334 |
| 2014/0299202 A1 | 10/2014 | Winkler et al. | |
| 2014/0311130 A1 | 10/2014 | Knittel et al. | |
| 2015/0027108 A1 | 1/2015 | Winkler et al. | |
| 2016/0053650 A1 | 2/2016 | Seitz et al. | |
| 2017/0363053 A1 | 12/2017 | Ichihashi et al. | |

FOREIGN PATENT DOCUMENTS

| | | |
|---|---|---|
| DE | 102009047375 | 6/2011 |
| EP | 2725227 | 5/2015 |
| JP | 10-159559 | 6/1998 |

* cited by examiner

Primary Examiner — P. Macade Nichols
(74) Attorney, Agent, or Firm — Nixon & Vanderhye P.C.

(57) ABSTRACT

A cooling device includes: a first port into which coolant flows; a first passage connected to the first port and extending to a periphery of a tip portion of an injection valve; a second port provided above the first port, through which the coolant flows out; a second passage connected to the first passage and extending from the periphery of the tip portion and connected to the second port; and a movable member configured to move in response to a flow of the coolant within a height between the first port and the second port to communicate the first passage and the second passage with each other when a flow rate of the coolant is lower than a predetermined flow rate and to disconnect the first passage and the second passage from each other when the flow rate of the coolant is higher than the predetermined flow rate.

8 Claims, 8 Drawing Sheets

COOLING DEVICE FOR ADDITIVE INJECTION VALVE

CROSS REFERENCE TO RELATED APPLICATION

This application is based on Japanese Patent Application No. 2017-248241 filed on Dec. 25, 2017, the disclosure of which is incorporated herein by reference in its entirety.

TECHNICAL FIELD

The present disclosure relates to a cooling device which uses a coolant to cool an injection valve for injecting an additive.

BACKGROUND ART

A cooling device has a guide to guide cooling water (coolant) to a distal end of an injection valve where a temperature increase easily occurs.

SUMMARY

According to an aspect of the present disclosure, a cooling device configured to cool, using a coolant, an injection valve that injects an additive includes:
a first port into which the coolant flows;
a first passage connected to the first port and extending to an outer periphery of a tip portion of the injection valve;
a second port provided above the first port, through which the coolant flows out;
a second passage connected to the first passage and extending along the injection valve from the outer periphery of the tip portion and connected to the second port; and
a movable member configured to move in response to a flow of the coolant within a height between the first port and the second port to communicate the first passage and the second passage with each other when a flow rate of the coolant is lower than a predetermined flow rate and to disconnect the first passage and the second passage from each other when the flow rate of the coolant is higher than the predetermined flow rate.

DETAILED DESCRIPTION

Hereinafter, an embodiment will be described with reference to the drawings, regarding a cooling device for an injection valve that injects urea (additive) into an exhaust passage of an internal combustion engine.

Figure 1:
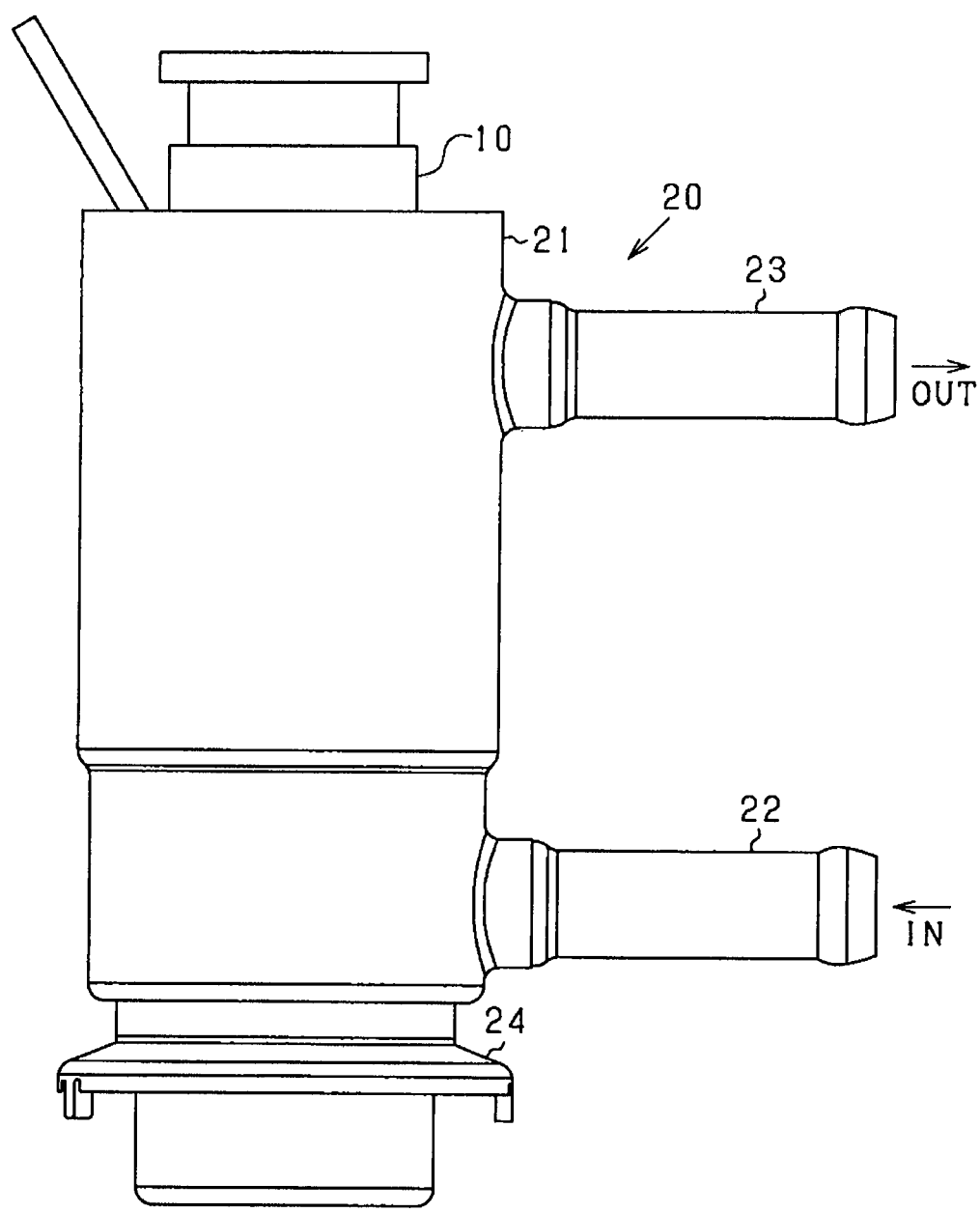
FIG. 1 is a front view illustrating an injection valve and a cooling device.
Figure 2:
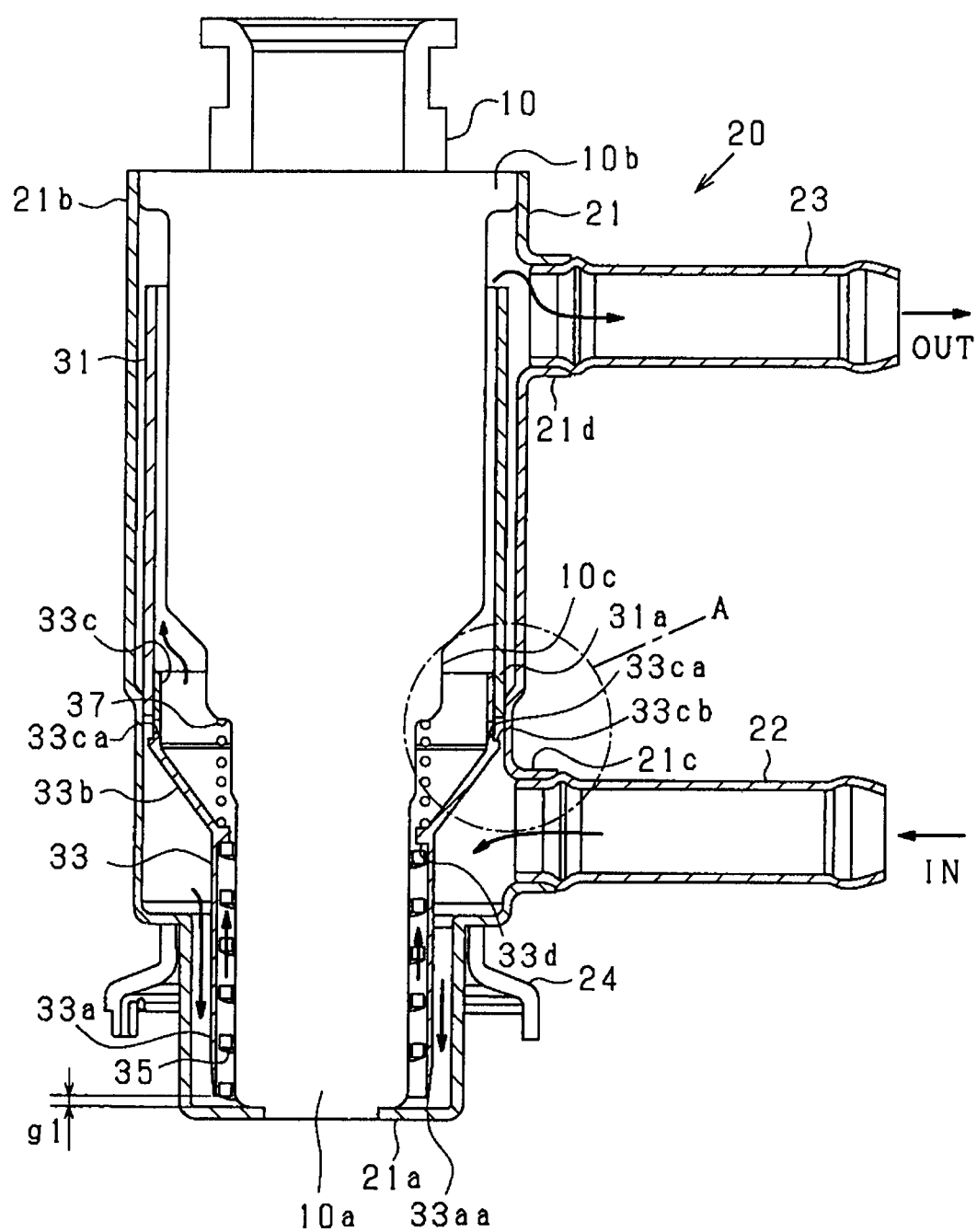
FIG. 2 is a partial cross-sectional view of FIG. 1 when a flow rate of cooling water is less than a predetermined flow rate.

As shown in FIGS. 1 and 2, a cooling device 20 (a cooling device for an additive injection valve) is attached to the injection valve 10. The injection valve 10 is formed in a cylindrical shape. The injection valve 10 injects urea from the tip portion 10a.

The cooling device 20 includes a main body 21, an inflow pipe 22, an outflow pipe 23, a fixed member 31, a movable member 33, a first spring 35, a second spring 37, and a mounting member 24. The cooling device 20 is attached to the exhaust pipe of the internal combustion engine by the mounting member 24.

The main body 21 is formed in a cylindrical shape having a diameter larger than the diameter of the injection valve 10. The first end portion 21a of the main body 21 is joined to the outer peripheral surface of the tip portion 10a of the injection valve 10. The second end portion 21b of the main body 21 is joined to the outer peripheral surface of the enlarged diameter portion 10b (base end portion) of the injection valve 10. An inflow port 21c and an outflow port 21d are formed in the main body 21. The inflow pipe 22 is connected to the inflow port 21c (first port). The outflow pipe 23 is connected to the outflow port 21d (second port). The outflow port 21d is located above the inflow port 21c. That is, the outflow port 21d is provided above the inflow port 21c. Cooling water (coolant) is supplied from the inflow pipe 22, and the cooling water is discharged from the outflow pipe 23.

The cylindrical fixed member 31 is housed inside the main body 21. The fixed member 31 is provided within a range from the inflow port 21c to the outflow port 21d. A first end portion 31a of the fixed member 31 adjacent to the inflow port 21c is fixed to the main body 21. A clearance between the first end portion 31a and the main body 21 is sealed. A part of the injection valve 10, specifically, not including the tip portion 10a is inserted inside the fixed member 31. A predetermined clearance is formed between the inner peripheral surface of the fixed member 31 and the outer peripheral surface of the injection valve 10, and the predetermined clearance defines a passage for the cooling water.

The cylindrical movable member 33 is housed inside the main body 21. The movable member 33 is provided within a range from the tip portion 10a of the injection valve 10 to the first end portion 31a of the fixed member 31. A part of the injection valve 10, specifically, including the tip portion 10a is inserted into the movable member 33. The movable member 33 includes a first cylindrical portion 33a, a conical portion 33b, and a second cylindrical portion 33c in this order from the distal end (adjacent to the first end portion 21a).

The first cylindrical portion 33a and the second cylindrical portion 33c are formed in cylindrical shape. The diameter of the first cylindrical portion 33a is smaller than the diameter of the second cylindrical portion 33c. The conical portion 33b is formed in a conical cylindrical shape. The conical portion 33b connects the first cylindrical portion 33a and the second cylindrical portion 33c. The diameter of the conical portion 33b is enlarged from a side adjacent to the first cylindrical portion 33a toward the other side adjacent to the second cylindrical portion 33c. A predetermined clearance is formed between the respective inner peripheral surfaces of the first cylindrical portion 33a, the conical portion 33b, and the second cylindrical portion 33c and the outer peripheral surface of the injection valve 10, as a passage for the cooling water. A predetermined clearance is formed between the respective outer peripheral surfaces of the first cylindrical portion 33a, the conical portion 33b, and the second cylindrical portion 33c and the inner peripheral surface of the main body 21, as a passage for the cooling water.

A first passage is defined by the predetermined clearance between the respective outer peripheral surfaces of the first cylindrical portion 33a, the conical portion 33b, and the second cylindrical portion 33c and the inner peripheral surface of the main body 21. The first passage is connected to the inflow port 21c and extends to the outer periphery of the tip portion 10a of the injection valve 10. A second passage is defined by the predetermined clearance between the respective inner peripheral surfaces of the first cylindrical portion 33a, the conical portion 33b, the second cylindrical portion 33c, and the fixed member 31 and the outer peripheral surface of the injection valve 10. The second passage is connected to the first passage, extends along the injection valve 10 from the outer periphery of the tip portion 10a, and is connected to the outflow port 21d.

A projection 33d projecting annularly on the inner peripheral side is formed at the boundary between the first cylindrical portion 33a and the conical portion 33b. A smaller clearance is formed between the outer circumferential surface of the injection valve 10 and the inner circumferential surface of the projection 33d, and is smaller than those on both the upstream side and the downstream side in the flow of the cooling water. In other words, the projection 33d (throttle portion) reduces the passage area at the predetermined position in the second passage to be smaller than the passage area at the position adjacent to the predetermined position.

The first spring 35 is housed inside the first cylindrical portion 33a. The first spring 35 (regulating portion) is disposed between the outer peripheral surface of the injection valve 10 and the inner peripheral surface of the first cylindrical portion 33a. The first spring 35 is disposed between the first end portion 21a of the main body 21 and the projection 33d. A clearance is formed between the outer peripheral surface of the injection valve 10 and the first spring 35, and a clearance is formed between the inner peripheral surface of the first cylindrical portion 33a and the first spring 35. The first spring 35 is formed by a coil spring having a spring coefficient k1.

An intermediate diameter portion 10c having a diameter larger than the diameter of the tip portion 10a is formed in the middle of the injection valve 10. The second spring 37 is disposed between the intermediate diameter portion 10c and the projection 33d. The second spring 37 (urging member) is formed by a coil spring having a spring coefficient k2. One end of the second spring 37 is in contact with the intermediate diameter portion 10c, and the other end of the second spring 37 is in contact with the projection 33d. The second spring 37 urges the movable member 33 toward the tip portion 10a of the injection valve 10 and the first end portion 21a of the main body 21.

As a result, one end of the first spring 35 is in contact with the projection 33d, and the other end of the first spring 35 is in contact with the first end portion 21a of the main body 21. The spring coefficient k1 of the first spring 35 is sufficiently larger than the spring coefficient k2 of the second spring 37 (k1>>k2). Therefore, even if the first spring 35 is pushed by the projection 33d, the first spring 35 hardly contracts, and the movement of the movable member 33 toward the first end portion 21a is regulated by the first spring 35.

Figure 3:
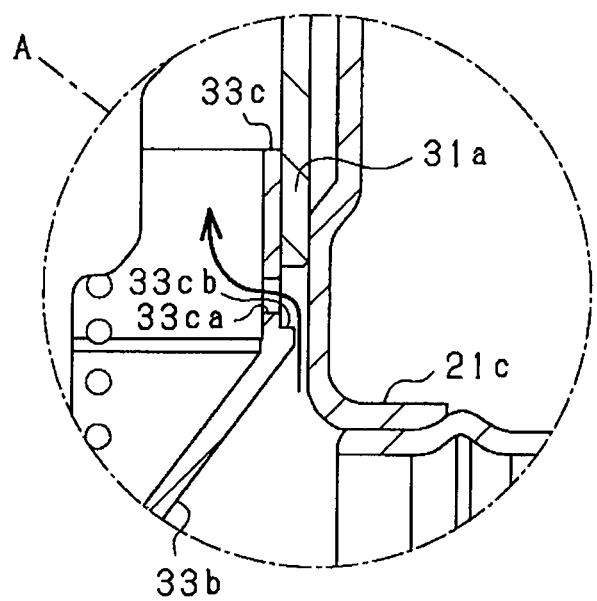
FIG. 3 is an enlarged view of a portion A in FIG. 2.

As shown in FIG. 3 which is an enlarged view of a portion A in FIG. 2, plural through holes 33ca are formed in a portion of the second cylindrical portion 33c of the movable member 33 adjacent to the conical portion 33b. The plural through holes 33ca (communication passages) communicate the outer peripheral side and the inner peripheral side of the second cylindrical portion 33c (the movable member 33). That is, the plural through holes 33ca make the first passage and the second passage to communicate with each other within a height between the inflow port 21c and the outflow port 21d.

A protrusion 33cb that protrudes annularly on the outer peripheral side is formed in a portion of the second cylindrical portion 33c between the conical portion 33b and the through hole 33ca. A portion of the second cylindrical portion 33c opposite to the conical portion 33b (protrusion 33cb) through the through hole 33ca is slidably fitted to the first end portion 31a of the fixed member 31. The end surface of the first end portion 31a and the protrusion 33cb are opposed to each other.

The inflow port 21c faces the conical portion 33b of the movable member 33. Therefore, the cooling water flowing inside from the inflow port 21c strikes the outer peripheral surface (inclined surface) of the conical portion 33b. When a flow of cooling water is applied to the outer peripheral surface of the conical portion 33b, a force for moving the movable member 33 toward the fixed member 31 (the side opposite to the first end portion 21a of the main body 21) acts. As the flow rate of the cooling water striking the outer peripheral surface of the conical portion 33b increases, the force for moving the movable member 33 toward the fixed member 31 increases.

FIGS. 2 and 3 illustrate the state of the movable member 33 when the flow rate of the cooling water is smaller than the predetermined flow rate. In this case, the movable member 33 is urged toward the first end portion 21a of the main body 21 by the second spring 37, and the projection 33d is in contact with the first spring 35. As a result, the movement of the movable member 33 toward the first end portion 21a of the main body 21 is regulated by the first spring 35. A first clearance g1 is formed between the distal end 33ca of the first cylindrical portion 33a and the first end portion 21a of the main body 21. The end surface of the first end portion 31a of the fixed member 31 and the protrusion 33cb are separated from each other, and the through hole 33ca is open. Therefore, the first passage and the second passage are communicated with each other by the through hole 33ca at the height between the inflow port 21c and the outflow port 21d.

That is, a communication passage (the through hole 33ca) is formed between the fixed member 31 and the movable member 33 so as to communicate the first passage and the second passage with each other at a height between the inflow port 21c and the outflow port 21d. The second spring 37 urges the movable member 33 in a direction to communicate the first passage and the second passage. At a height between the inflow port 21c and the outflow port 21d, in a state where the movable member 33 makes the first passage and the second passage to communicate with each other, the projection 33d is in contact with the first spring 35 at a location opposite from the second spring 37.

Figure 4:
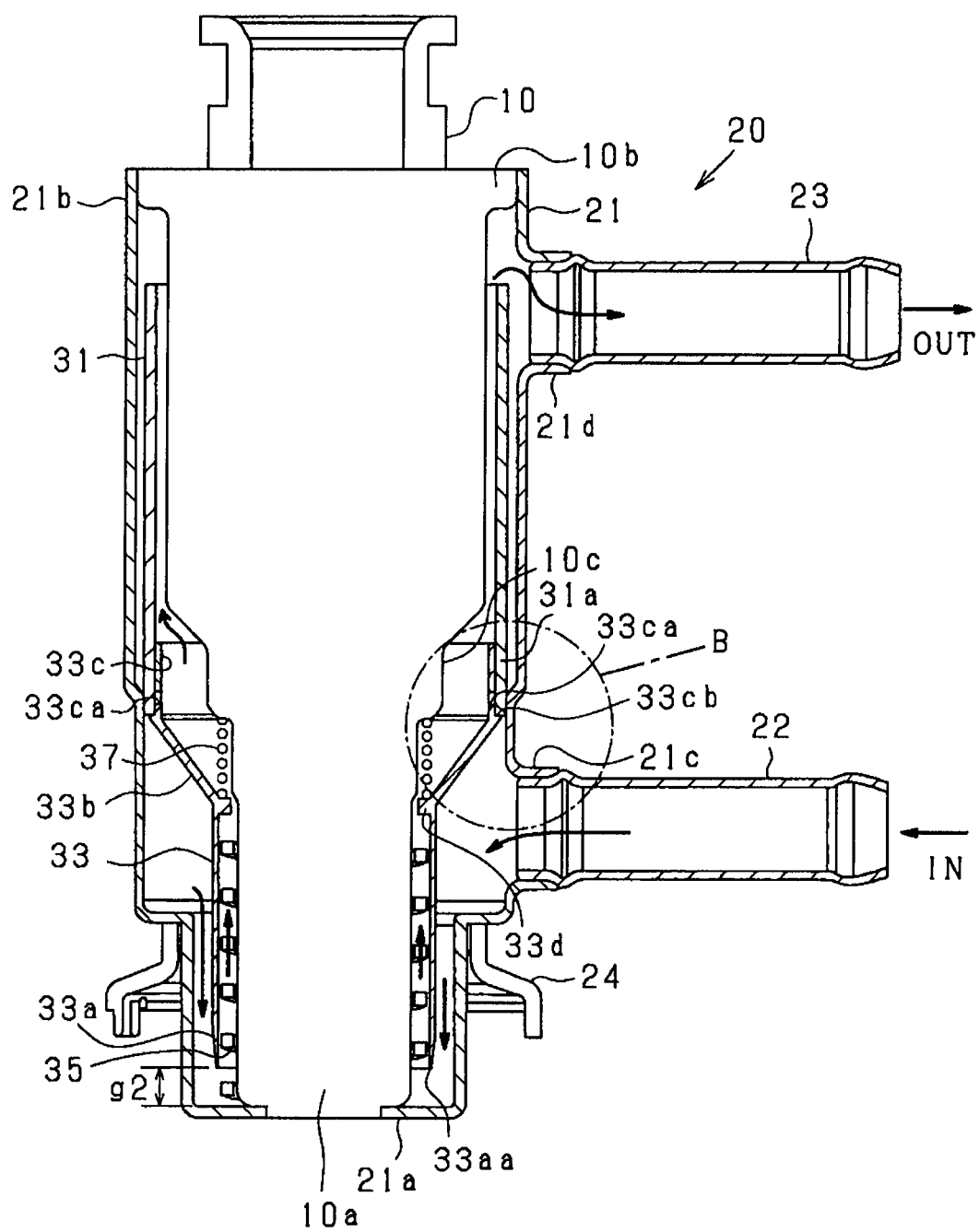
FIG. 4 is a partial cross-sectional view of FIG. 1 when a flow rate of cooling water is greater than a predetermined flow rate.
Figure 5:
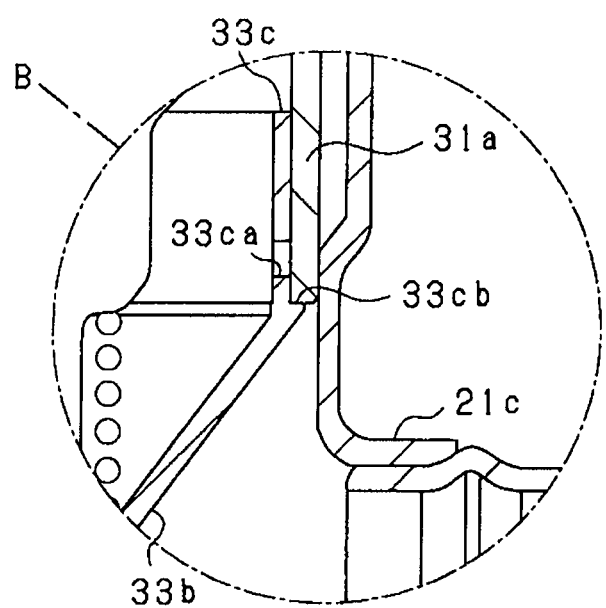
FIG. 5 is an enlarged view of a portion B in FIG. 4.

FIGS. 4 and 5 illustrate the state of the movable member 33 when the flow rate of the cooling water is larger than the predetermined flow rate. As described above, when a flow of cooling water is applied to the outer peripheral surface of the conical portion 33b, a force for moving the movable member 33 toward the fixed member 31 (a side opposite to the first end portion 21a of the main body 21) is applied. Therefore, when the flow rate of the cooling water is larger than the predetermined flow rate, the movable member 33 moves against the urging force of the second spring 37 to the side opposite to the first end portion 21a of the main body 21 (toward the outflow port 21d).

As shown in FIG. 5 which is an enlarged view of a portion B in FIG. 4, the end surface of the first end portion 31a of the fixed member 31 is in contact with the protrusion 33cb. As a result, the movement of the movable member 33 toward the fixed member 31 is regulated by the first end portion 31a of the fixed member 31. Then, the through hole 33ca is closed by the first end portion 31a of the fixed member 31. Therefore, at the height between the inflow port 21c and the outflow port 21d, the first passage and the second passage are disconnected from each other. That is, the outer peripheral surface of the conical portion 33b of the movable member 33 generates a force for moving the movable member 33 in the direction to disconnect the first passage and the second passage from each other in response to the flow of the cooling water flowing from the inflow port 21c. The movable member 33 moves in response to the flow of the cooling water to disconnect the first passage and the second passage at the height between the inflow port 21c and the outflow port 21d.

In this state, a second clearance g2 is formed between the distal end 33aa of the first cylindrical portion 33a and the first end portion 21a of the main body 21. The second clearance g2 is larger than the first clearance g1 (g2>g1). That is, the passage area of the portion communicating with the outer periphery of the tip portion 10a of the injection valve 10 in the first passage is larger when the movable member 33 disconnects the first passage and the second passage from each other than when the movable member 33 makes the first passage and the second passage to communicate with each other.

Further, as described above, a clearance smaller than both the upstream side and the downstream side in the flow of the cooling water is formed between the outer circumferential surface of the injection valve 10 and the inner circumferential surface of the projection 33d. Therefore, the projection 33d functions as a throttle portion formed in the second passage. The pressure of the cooling water on the upstream side of the projection 33d becomes higher than the pressure of the cooling water on the downstream side of the projection 33d, such that a force for moving the movable member 33 toward the fixed member 31 is generated. That is, the projection 33d generates a force for moving the movable member 33 in a direction to disconnect the first passage and the second passage from each other, by receiving a flow of the cooling water.

When bubbles (water vapor) are generated due to the boiling of the cooling water, the bubbles may accumulate in the upper space of the first passage (near the portion A in FIG. 2). In particular, when the flow rate of the cooling water is less than the predetermined flow rate, bubbles are liable to be generated by the boiling of the cooling water. When the flow rate of the cooling water is larger than the predetermined flow rate, the cooling water hardly boils and bubbles are unlikely to occur. That is, as the flow rate of the cooling water decreases, bubbles are more likely to occur. As the flow rate of the cooling water increases, bubbles are less prone to occur. The cooling device 20 for the injection valve 10 according to the embodiment having the above configuration has the following advantages.

The movable member 33 moves in response to the flow of the cooling water so that the first passage and the second passage are made to communicate with each other when the flow rate of the cooling water is lower than the predetermined flow rate, at the height between the inflow port 21c and the outflow port 21d. Therefore, when bubbles are likely to occur, it is possible to escape the bubbles staying in the upper space of the first passage from the first passage to the second passage at the height between the inflow port 21c and the outflow port 21d. Then, the bubbles can escape through the second passage and flow out from the outflow port 21d.

The movable member 33 moves in response to the flow of the cooling water so that the first passage and the second passage are disconnected from each other when the flow rate of the cooling water is higher than the predetermined flow rate at the height between the inflow port 21c and the outflow port 21d. Therefore, when bubbles are unlikely to occur, it is possible to make all the cooling water flow to the outer periphery of the tip portion 10a of the injection valve 10. Therefore, it is possible to keep the efficiency of cooling the tip portion 10a of the injection valve 10 as high. Further, since the movable member 33 moves by receiving the flow of the cooling water, it is possible to connect or disconnect the first passage and the second passage using the flow of the cooling water.

When the outer peripheral surface of the conical portion 33b of the movable member 33 receives the flow of the cooling water flowing from the inflow port 21c, a force for moving the movable member 33 in a direction to disconnect the first passage and the second passage is generated. As the flow rate of the cooling water striking the outer peripheral surface of the conical portion 33b increases, the force for moving the movable member 33 increases. Therefore, when the flow rate of the cooling water becomes larger than the predetermined flow rate and the force for moving the movable member 33 becomes large, the first passage and the second passage can be blocked from each other by the movable member 33.

The passage area of the portion communicating with the outer periphery of the tip portion 10a of the injection valve 10 in the first passage is larger when the movable member 33 blocks the first passage and the second passage from each other than when the movable member 33 makes the first passage and the second passage to communicate with each other. Therefore, when the flow rate of the cooling water is larger than the predetermined flow rate and the first passage and the second passage are blocked by the movable member 33, the flow rate of the cooling water flowing to the outer periphery of the tip portion 10a of the injection valve 10 is further increased. Therefore, when the flow rate of the cooling water is larger than the predetermined flow rate, the efficiency of cooling the tip portion 10a of the injection valve 10 can be improved.

The projection 33d of the movable member 33 reduces the passage area at the predetermined position in the second passage to be smaller than the passage area at both adjacent positions of the predetermined position. Therefore, the pressure of the cooling water on the upstream side of the projection 33d becomes higher than the pressure of the cooling water on the downstream side of the projection 33d, such that a force for moving the movable member 33 toward the fixed member 31 is generated. That is, the projection 33d generates a force for moving the movable member 33 in a direction to block the first passage and the second passage from each other, by receiving a flow of the cooling water. As the flow rate of the cooling water passing by the projection 33d increases, the force for moving the movable member 33 increases. For this reason, the projection 33d can also generate a force for moving the movable member 33 in a direction to block the first passage and the second passage from each other. When the flow rate of the cooling water is larger than the predetermined flow rate, it is possible to disconnect the first passage and the second passage from each other.

Since the movable member 33 is urged by the second spring 37 in a direction to bring the first passage and the second passage into communication, when the flow rate of the cooling water is smaller than the predetermined flow rate, the first passage and the second passage can be reliably communicated with each other by the through hole 33ca.

The cooling device includes the second spring 37 for urging the movable member 33 in a direction to make the first passage and the second passage communicate with each other, and one end of the second spring 37 is in contact with the projection 33d. Therefore, the projection 33d can function as a portion (spring receiving portion) for receiving the second spring 37.

The projection 33d is in contact with the first spring 35 that restricts the movement of the movable member 33 on the side opposite to the second spring 37 in a state where the movable member 33 is biased by the second spring 37 to make the first passage and the second passage communicate with each other. Therefore, the projection 33d can function as a portion to be brought into contact with the first spring 35 (regulating portion).

It should be noted that the above embodiment may be modified as follows. The same parts as those of the above embodiment are denoted by the same reference numerals, and the description thereof will be omitted.

The projection 33d may be formed in the first cylindrical portion 33a.

One end of the second spring 37 may be in contact with a portion of the movable member 33 other than the projection 33d, for example, the conical portion 33b. Further, one end of the first spring 35 may be in contact with a portion of the movable member 33 other than the projection 33d. In that case, it is also possible to adopt a configuration in which the passage area at the predetermined position in the second passage is not reduced by the projection 33d to be smaller than the passage area at the position on both sides of the predetermined position.

Figure 6:
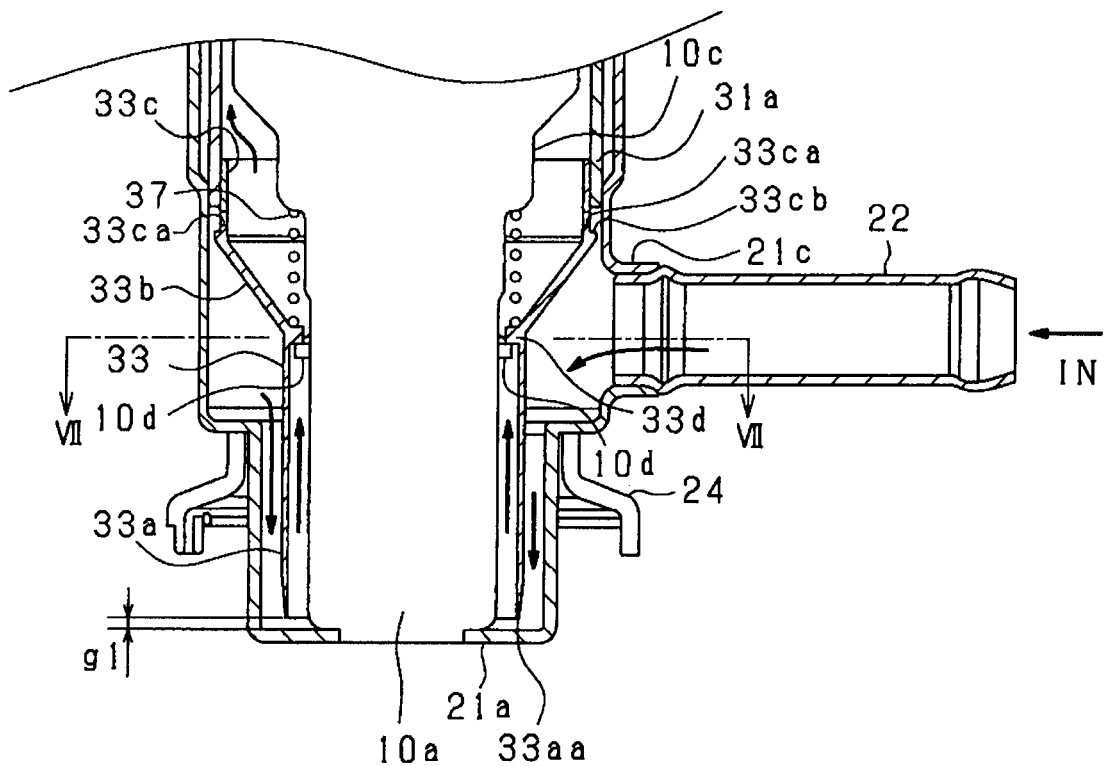
FIG. 6 is a partial cross-sectional view illustrating a modification of a regulating portion.
Figure 7:
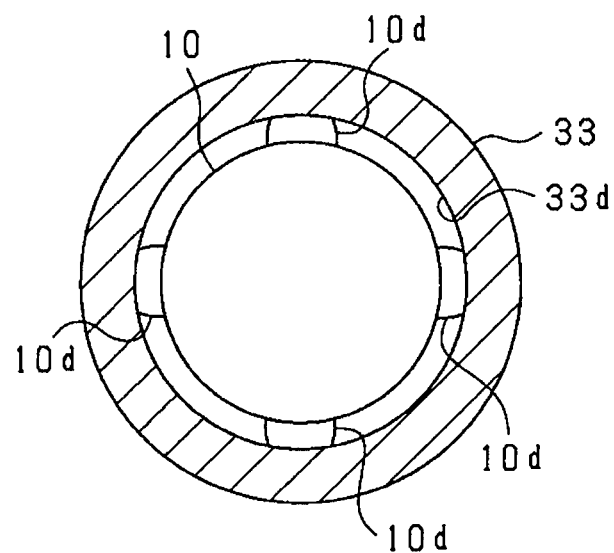
FIG. 7 is a cross-sectional view taken along a line VII-VII of FIG. 6.

As shown in FIGS. 6 and 7, instead of the first spring 35 (regulating portion), plural protrusions 10d abutting the projection 33d of the movable member 33 may be provided at the outer peripheral portion of the injection valve 10. FIG. 7 is a cross-sectional view taken along a line VII-VII of FIG. 6, in which the illustrating of the inside of the injection valve 10 is omitted. The projection 33d is in contact with the plural protrusions 10d regulating the movement of the movable member 33, on the side opposite to the second spring 37, in a state where the through hole 33ca of the movable member 33, which is biased by the second spring 37, communicates the first passage and the second passage.

Other than the outer peripheral surface of the conical portion 33b, an inclined surface may be provided for generating a force for moving the movable member 33 in a direction to disconnect the first passage and the second passage from each other by receiving the flow of the cooling water flowing from the inflow port 21c. The inclined surface may be a curved surface or a flat surface.

Figure 8:
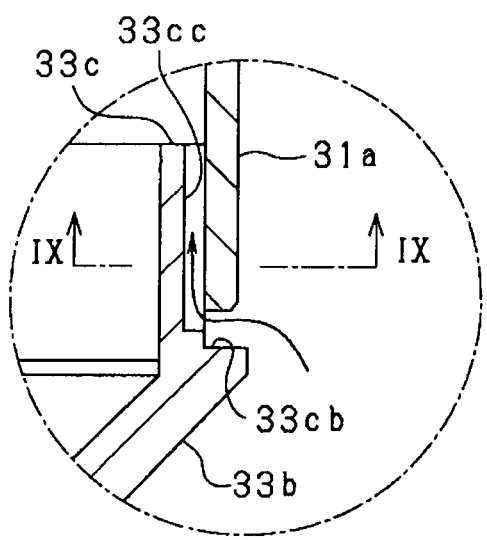
FIG. 8 is an enlarged view illustrating a modification of a communication passage when a flow rate of cooling water is smaller than a predetermined flow rate.
Figure 9:
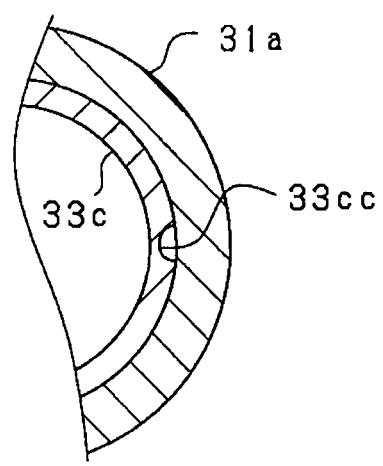
FIG. 9 is a cross-sectional view taken along a line IX-IX in FIG. 8.
Figure 10:
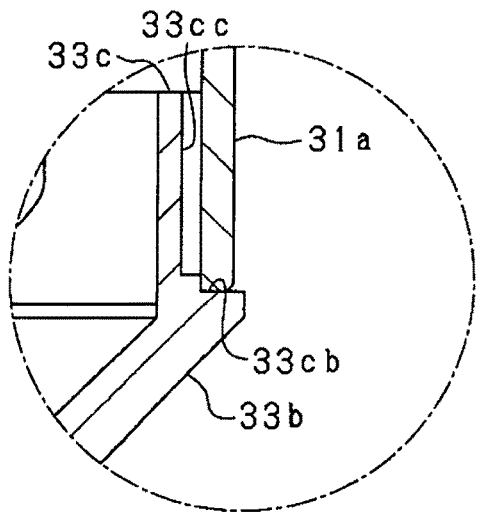
FIG. 10 is an enlarged view illustrating a modification of a communication passage when a flow rate of cooling water is greater than a predetermined flow rate.

As shown in FIGS. 8 and 9, a groove 33cc may be formed in the second cylindrical portion 33c of the movable member 33, instead of the through hole 33ca of FIG. 2. FIG. 9 is a cross-sectional view taken along the line IX-IX of FIG. 8. That is, the groove 33cc (communication passage) for communicating the first passage and the second passage may be formed by the fixed member 31 and the movable member 33 at the height between the inflow port 21c (the first port) and the outflow port 21d (the second port). FIGS. 8 and 9 illustrate the state of the movable member 33 when the flow rate of the cooling water is smaller than the predetermined flow rate, and the groove 33cc is open. FIG. 10 illustrates the state of the movable member 33 when the flow rate of the cooling water is larger than the predetermined flow rate, and the groove 33cc is closed by the first end portion 31a and the protrusion 33cb of the fixed member 31.

Figure 11:
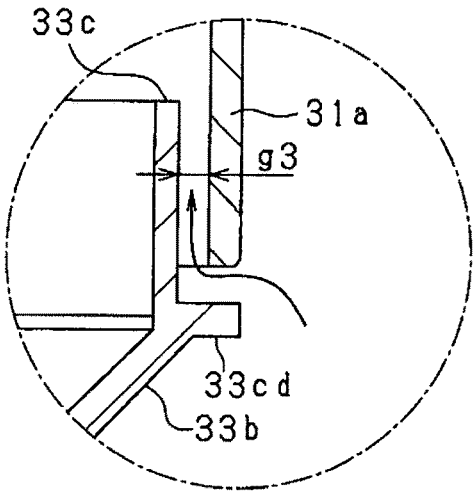
FIG. 11 is an enlarged view illustrating a modification of a communication passage when a flow rate of cooling water is smaller than a predetermined flow rate.
Figure 12:
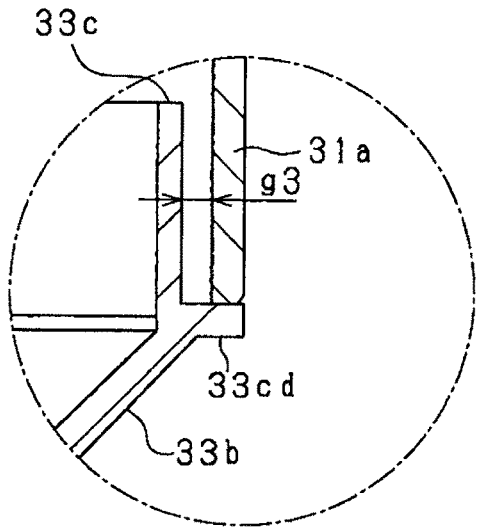
FIG. 12 is an enlarged view illustrating a modification of a communication passage when a flow rate of cooling water is greater than a predetermined flow rate.

As shown in FIGS. 11 and 12, instead of the through hole 33ca of FIG. 2, a clearance g3 is formed between the inner peripheral surface of the first end portion 31a of the fixed member 31 and the outer peripheral surface of the second cylindrical portion 33c. In the second cylindrical portion 33c, instead of the protrusion 33cb of FIG. 2, a protrusion 33cd protruding more than the protrusion 33cb may be formed annularly on the outer peripheral side. That is, the fixed member 31 and the movable member 33 form a clearance g3 (communication passage) for communicating the first passage and the second passage at the height between the inflow port 21c (the first port) and the outflow port 21d (the second port). FIG. 11 illustrates the state of the movable member 33 when the flow rate of the cooling water is smaller than the predetermined flow rate, and the clearance g3 is open. FIG. 12 illustrates the state of the movable member 33 when the flow rate of the cooling water is larger than the predetermined flow rate, and the clearance g3 is closed by the first end portion 31a and the protrusion 33cd of the fixed member 31.

The second spring 37 can be omitted, if the gravity acting on the movable member 33 can make the first passage and the second passage to communicate with each other when the flow rate of the cooling water is lower than the predetermined flow rate at the height between the inflow port 21c and the outflow port 21d.

The cooling device 20 of the injection valve 10 may employ a cooling medium other than cooling water as the coolant.

The injection valve 10 may inject additives other than urea, for example, a reducing agent such as fuel.

In a comparison example, when cooling water boils, bubbles are generated, the bubbles may stay in a space covered with a wall of the guide. In that case, the bubbles act as a heat insulating layer, and the efficiency of cooling the injection valve decreases. In case where a passage is formed inside the cooling device, through which the bubbles escape, if the passage reduces the cooling water flowing to the tip portion of the injection valve, the cooling efficiency may decrease at the tip portion of the injection valve.

The present disclosure provides a cooling device for an additive injection valve, in which bubbles are restricted from staying in the cooling device, and the cooling efficiency is restricted from decreasing at the tip portion of the injection valve.

Specifically, a cooling device configured to cool, using a coolant, an injection valve that injects an additive includes: a first port into which the coolant flows; a first passage connected to the first port and extending to an outer periphery of a tip portion of the injection valve; a second port provided above the first port, through which the coolant flows out; a second passage connected to the first passage and extending along the injection valve from the outer periphery of the tip portion and connected to the second port; and a movable member configured to move in response to a flow of the coolant within a height between the first port and the second port to communicate the first passage and the second passage with each other when a flow rate of the coolant is lower than a predetermined flow rate and to disconnect the first passage and the second passage from each other when the flow rate of the coolant is higher than the predetermined flow rate.

According to the above configuration, in the cooling device, the injection valve that injects the additive is cooled by the coolant. The first passage is connected to the first port and extends to the outer periphery of the tip portion of the injection valve. Therefore, the coolant flowing from the first port flows through the first passage and cools the outer circumference of the tip portion of the injection valve. Thus, the tip portion of the injection valve can be efficiently cooled.

The second port is provided above the first port, and the coolant flows out from the second port. The second passage is connected to the first passage and extends from the outer periphery of the tip portion of the injection valve along the injection valve and is connected to the second port. Therefore, the coolant flowing to the outer periphery of the tip portion of the injection valve flows through the second passage along the injection valve and flows out from the second port. Therefore, the coolant that has flowed from the tip portion of the injection valve and cools the injection valve can flow out from the second port.

When the coolant boils, bubbles are generated, and the bubbles may stay in the upper space of the first passage. In particular, when the flow rate of the coolant is lower than the predetermined flow rate, the coolant easily boils and bubbles are liable to occur. In this respect, the movable member moves by receiving the flow of the coolant, so that the first passage and the second passage communicate with each other at the height between the first port and the second port, when the flow rate of the coolant is smaller than the predetermined flow rate. Therefore, in the case where the bubbles are likely to occur, it is possible to escape the bubbles staying in the upper space inside the first passage from the first passage to the second passage at the height between the first port and the second port. Then, the bubbles can escape through the second passage and flow out from the second port.

When the flow rate of the coolant is higher than the predetermined flow rate, the coolant does not easily boil, and bubbles are unlikely to occur. In this respect, the movable member moves by receiving the flow of the coolant, so that the first passage and the second passage are not communicated with each other at a height between the first port and the second port, when the flow rate of the coolant is higher than the predetermined flow rate. Therefore, when bubbles are unlikely to occur, it is possible to make all the coolant flow to the outer circumference of the tip portion of the injection valve. Therefore, it is possible to prevent the efficiency of cooling the tip portion of the injection valve from decreasing. Further, since the movable member moves in response to the flow of the coolant, it is possible to connect or disconnect the first passage and the second passage using the flow of the coolant.

For example, the movable member may have an inclined surface to generate a force for moving the movable member in a direction of disconnecting the first passage and the second passage from each other by receiving a flow of the coolant flowing from the first port.

According to the above configuration, the inclined surface of the movable member receives the flow of the coolant flowing from the first port, thereby generating a force for moving the movable member in a direction to block the first passage and the second passage from each other. Then, as the flow rate of the coolant striking the inclined surface increases, the force for moving the movable member increases. Therefore, when the flow rate of the coolant becomes larger than the predetermined flow rate and the force for moving the movable member increases, the first passage and the second passage can be blocked from each other by the movable member.

A portion of the first passage communicating with the outer periphery of the tip portion may have a passage area which is larger when the movable member blocks the first passage and the second passage from each other than when the movable member communicates the first passage and the second passage with each other. Therefore, when the flow rate of the coolant is larger than the predetermined flow rate and the first passage and the second passage are blocked from each other by the movable member, the flow rate of the coolant flowing to the outer circumference of the tip portion of the injection valve is further increased. Therefore, when the flow rate of the coolant is larger than the predetermined flow rate, the efficiency of cooling the tip portion of the injection valve can be improved.

Specifically, a fixed member may be fixed so as not to move, and a communication passage is formed by the fixed member and the movable member within the height between the first port and the second port to communicate the first passage and the second passage with each other. The movable member receives a flow of the coolant and moves with respect to the fixed member to open the communication passage when the flow rate of the coolant is smaller than the predetermined flow rate and to close the communication passage when the flow rate of the coolant is larger than the predetermined flow rate.

For example, the movable member may have a throttle portion that reduces a passage area at a predetermined position in the second passage to be smaller than a passage area at a position adjacent to the predetermined position. The throttle portion generates a force for moving the movable member in a direction to block the first passage and the second passage from each other by receiving a flow of the coolant.

According to the above configuration, the passage area at the predetermined position in the second passage is made smaller than the passage area at the both adjacent positions of the predetermined position by the throttle portion of the movable member. Therefore, the pressure of the coolant at the upstream of the throttle portion becomes higher than the pressure of the coolant at the downstream side of the throttle portion, and a force for moving the movable member in a direction to disconnect the first passage and the second passage is generated. That is, the throttle portion generates a force to move the movable member in a direction to block the first passage and the second passage from each other, by receiving a flow of the coolant. As the flow rate of the coolant passing by the throttle portion increases, the force for moving the movable member increases. Since the throttle portion can also generate a force for moving the movable member in a direction to block the first passage and the second passage from each other, when the flow rate of the coolant is larger than the predetermined flow rate, the first passage and the second passage can be blocked from each other.

The cooling device may further include an urging member that urges the movable member in a direction to make the first passage and the second passage to communicate with each other.

According to the above configuration, since the movable member is urged by the urging member in the direction of communicating the first passage and the second passage, when the flow rate of the coolant is smaller than the predetermined flow rate, the first passage and the second passage can be reliably communicated with each other.

Further, one end of the urging member may be in contact with the throttle portion. Therefore, while the above-described effect is exerted, the throttle portion can function as a portion (for example, a spring receiver) for receiving the urging member.

The throttle portion may be in contact with a regulating portion that regulates the movement of the movable member on a side opposite to the urging member in a state where the movable member makes the first passage and the second passage to communicate with each other.

According to the above configuration, the throttle portion is in contact with the regulating portion that restricts the movement of the movable member, on the side opposite to the urging member, in a state where the movable member is biased by the urging member to cause the first passage and the second passage to communicate with each other. Therefore, while the above-described effect is exerted, the throttle portion can be made to function as a portion to be brought into contact with the regulating portion.

Such changes and modifications are to be understood as being within the scope of the present disclosure as defined by the appended claims.

What is claimed is:

1. A cooling device configured to cool, using a coolant, an injection valve that injects an additive, the cooling device comprising:
    a first port into which the coolant flows;
    a first passage connected to the first port and extending to an outer periphery of a tip portion of the injection valve;
    a second port provided above the first port, through which the coolant flows out;
    a second passage connected to the first passage and extending along the injection valve from the outer periphery of the tip portion and connected to the second port; and
    a movable member configured to move in response to a flow of the coolant within a height between the first port and the second port to communicate the first passage and the second passage with each other when a flow rate of the coolant is lower than a predetermined flow rate and to disconnect the first passage and the second passage from each other when the flow rate of the coolant is higher than the predetermined flow rate.

2. The cooling device according to claim 1, wherein the movable member has an inclined surface to generate a force for moving the movable member in a direction of disconnecting the first passage and the second passage from each other by receiving a flow of the coolant flowing from the first port.

3. The cooling device according to claim 1, wherein
    a portion of the first passage communicating with the outer periphery of the tip portion has a passage area which is larger when the movable member disconnects the first passage and the second passage from each other than when the movable member communicates the first passage and the second passage with each other.

4. The cooling device according to claim 1, further comprising: a fixed member fixed not to move, wherein
    a communication passage is formed by the fixed member and the movable member within the height between the first port and the second port to communicate the first passage and the second passage with each other, and
    the movable member receives a flow of the coolant and moves with respect to the fixed member to open the communication passage when the flow rate of the coolant is smaller than the predetermined flow rate and to close the communication passage when the flow rate of the coolant is larger than the predetermined flow rate.

5. The cooling device according to claim 1, wherein
    the movable member has a throttle portion that reduces a passage area at a predetermined position in the second passage to be smaller than a passage area at a position adjacent to the predetermined position, and
    the throttle portion generates a force for moving the movable member in a direction to disconnect the first passage and the second passage from each other by receiving a flow of the coolant.

6. The cooling device according to claim 1, further comprising an urging member that urges the movable member in a direction to make the first passage and the second passage to communicate with each other.

7. The cooling device according to claim 5, further comprising: an urging member that urges the movable member in a direction to make the first passage and the second passage to communicate with each other, and
    one end of the urging member is in contact with the throttle portion.

8. The cooling device according to claim 7, wherein
    the throttle portion is in contact with a regulating portion that regulates the movement of the movable member on a side opposite to the urging member in a state where the movable member makes the first passage and the second passage to communicate with each other.

* * * * *